United States Patent
Xu et al.

(10) Patent No.: US 10,348,111 B2
(45) Date of Patent: Jul. 9, 2019

(54) CHARGING CIRCUIT AND THE METHOD THEREOF

(71) Applicant: Monolithic Power Systems, Inc., San Jose, CA (US)

(72) Inventors: Min Xu, Hangzhou (CN); Xiaoqing Li, Hangzhou (CN); Qiming Zhao, Hangzhou (CN)

(73) Assignee: Monolithic Power Systems, Inc., San Jose, CA (US)

( * ) Notice: Subject to any disclaimer, the term of this patent is extended or adjusted under 35 U.S.C. 154(b) by 715 days.

(21) Appl. No.: 15/011,380

(22) Filed: Jan. 29, 2016

(65) Prior Publication Data

US 2016/0226285 A1 Aug. 4, 2016

(30) Foreign Application Priority Data

Feb. 2, 2015 (CN) .......................... 2015 1 0051873

(51) Int. Cl.
*H02M 3/158* (2006.01)
*H02J 7/00* (2006.01)
*H02M 3/156* (2006.01)

(52) U.S. Cl.
CPC .......... *H02J 7/0052* (2013.01); *H02J 7/0003* (2013.01); *H02J 7/007* (2013.01); *H02M 3/156* (2013.01); *H02M 3/158* (2013.01); *H02J 2007/0059* (2013.01)

(58) Field of Classification Search
CPC .................................................. H02J 7/0052
USPC .......................................................... 323/234
See application file for complete search history.

(56) References Cited

U.S. PATENT DOCUMENTS

| 8,717,002 | B2* | 5/2014 | Xi | H02M 3/158 323/285 |
|---|---|---|---|---|
| 8,749,216 | B2 | 6/2014 | Li et al. | |
| 8,896,278 | B2 | 11/2014 | Ouyang et al. | |
| 8,917,073 | B2 | 12/2014 | Yang et al. | |
| 8,922,177 | B2 | 12/2014 | Ren et al. | |
| 9,081,397 | B2 | 7/2015 | Jiang et al. | |
| 2009/0302820 | A1* | 12/2009 | Shimizu | H02M 3/156 323/285 |
| 2011/0127980 | A1* | 6/2011 | Chen | H02M 3/156 323/282 |
| 2014/0022684 | A1 | 6/2014 | Jiang et al. | |
| 2014/0375286 | A1 | 12/2014 | Jiang et al. | |
| 2015/0244262 | A1 | 8/2015 | Ouyang | |
| 2015/0280486 | A1* | 10/2015 | Hsu | B60L 11/1818 320/107 |

* cited by examiner

*Primary Examiner* — Edward Tso
*Assistant Examiner* — Ahmed H Omar
(74) *Attorney, Agent, or Firm* — Perkins Coie LLP (57) ABSTRACT

A charging circuit adopts a plurality of feedback control circuits, a constant time signal generator and a logic circuit to control the operation of a power switch. The charge circuit needs no oscillator with high frequency, error amplifier with high speed and high accuracy, or compensation circuit with complicated structure, so the system portability is highly improved.

16 Claims, 7 Drawing Sheets

CHARGING CIRCUIT AND THE METHOD THEREOF

CROSS-REFERENCE TO RELATED APPLICATIONS

This application claims priority to and the benefit of Chinese Patent Application No. 201510051873.X, filed Feb. 2, 2015, which is incorporated herein by reference in its entirety.

FIELD

The present invention relates generally to electronic circuits, and more particularly but not exclusively to charging circuit and the method thereof.

BACKGROUND

Figure 1:
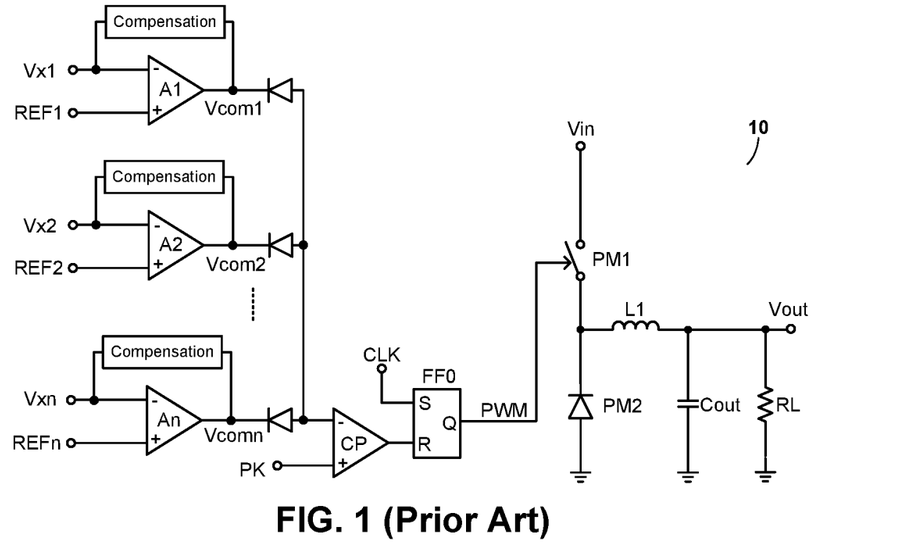
FIG. 1 schematically shows a charging circuit 10 used with a BUCK converter.

A charging circuit is used to control the charging process of a battery. Because of the diversified power supply and batteries, multiple variables, e.g., an input voltage (power supply voltage), an input current (power supply current), an output voltage (battery voltage) and an output current (charging current) and so on should be involved in the control of the charging process. FIG. 1 schematically shows a charging circuit 10 used with a BUCK converter. The charging circuit 10 comprises several control circuits, e.g., an input voltage control circuit, an input current control circuit, an output voltage control circuit and an output current control circuit and so on, wherein each control circuit has a specific amplifier and a compensation circuit. The operation of the charging circuit 10 is explained with the example of the output voltage control circuit. In every switching cycle, a clock signal CLK sets a RS flip-flop FF0 to generate a switching signal PWM to turn ON a high-side power switch PM1 and to turn OFF a low-side power switch PM2. Then a current drawn from the power supply of the charging circuit 10 flows through an inductor L1 to charge a battery which is represented by a resistor RL, and in the mean time, an output capacitor Cout is charged. As a result, the output voltage Vout and a feedback signal Vx1 indicative of the output voltage Vout increase. An error amplifier A1 receives the feedback signal Vx1 and a reference signal REF1 to generate an error amplified signal Vcom1 which is also referred as a feedback control signal, wherein the error amplified signal Vcom1 decreases as the feedback signal Vx1 increases. When the error amplified signal Vcom1 decreases to a peak control signal PK, a comparator CP generates a signal to reset the RS flip-flop FF0, so as to generate the switching signal PWM to turn OFF the high-side power switch PM1 and to turn ON the low-side power switch PM2. Then, instead of the power supply, the output capacitor Cout supplies power to the resistor RL, and the output voltage Vout decreases. When the RS flip-flop is set by the clock signal CLK again in the next switching cycle, the operation repeats.

In the charging circuit 10 in FIG. 1, each control circuit needs an error amplifier with high accuracy and high speed, and also needs a compensation circuit to stabilize the whole control circuit. As a result, the circuit is complicated and inefficiency. Meanwhile, each compensation circuit needs to be redesigned according to the different spec of different systems. Furthermore, the error amplified signal Vcom1~Vcomn of different control circuits are usually very close to each other, so the error switching may happens, or there may be more than one control circuits are working.

SUMMARY

The present invention pertains to provide a charging circuit with simple control circuits, easy switching between control circuits and improved portability.

In accomplishing the above and other objects, there has been provided, in accordance with an embodiment of the present invention, a charging circuit, comprising: a power switch; a plurality of feedback control circuits, wherein each feedback control circuit receives a corresponding reference signal, a corresponding feedback signal and a slope signal, and based on the corresponding reference signal, the corresponding feedback signal and the slope signal, each of the feedback control circuits generates a corresponding feedback control signal; a constant time signal generator configured to generate a constant time signal; and a logic circuit configured to receive the plurality of feedback control signals and the constant time signal, and based on the plurality of feedback control signals and the constant time signal, the logic circuit generates a switching signal to control the operation of the power switch.

There has been provided, in accordance with an embodiment of the present disclosure, a charging circuit with a power switch, comprising: an output voltage feedback control circuit comprising a first comparator having a first input terminal configured to receive an output voltage feedback signal and a slope signal, a second input terminal configured to receive a corresponding reference signal, and an output terminal configured to generate an output voltage control signal based on the reference signal, the output voltage feedback signal and the slope signal; an output current feedback control circuit comprising a second comparator having a first input terminal configured to receive an output current feedback signal and the slope signal, a second input terminal configured to receive a corresponding reference signal, and an output terminal configured to generate an output current control signal based on the reference signal, the output current feedback signal and the slope signal; an input voltage feedback control circuit comprising a third comparator having a first input terminal configured to receive an input voltage feedback signal and the slope signal, a second input terminal configured to receive a corresponding reference signal, and an output terminal configured to generate an input voltage control signal based on the reference signal, the input voltage feedback signal and the slope signal; an input current feedback control circuit comprising a fourth comparator having a first input terminal configured to receive an input current feedback signal and the slope signal, a second input terminal configured to receive a corresponding reference signal, and an output terminal configured to generate an input current control signal based on the reference signal, the input current feedback signal and the slope signal; a constant time signal generator configured to generate a constant time signal; and a logic circuit configured to receive the output voltage control signal, the output current control signal, the input voltage control signal, the input current control signal and the constant time signal, wherein the logic circuit generate a switching signal to control the operation of the power switch based on the output voltage control signal, the output current control signal, the input voltage control signal, the input current control signal and the constant time signal.

There has been provided, in accordance with an embodiment of the present disclosure, a method of controlling a charging circuit having a power switch, comprising: employing a plurality of feedback control circuits to respectively receive a plurality of reference signals, a plurality of feedback signals and a slope signal, wherein based on the corresponding reference signal, the corresponding feedback signal and the slope signal, each feedback control circuit generates a corresponding feedback control signal; generating a constant time signal; and choosing only one of the feedback control signals together with the constant time signal to control the operation of power switches of the charging circuit.

The use of the same reference label in different drawings indicates the same or like components.

DETAILED DESCRIPTION

In the present invention, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 2:
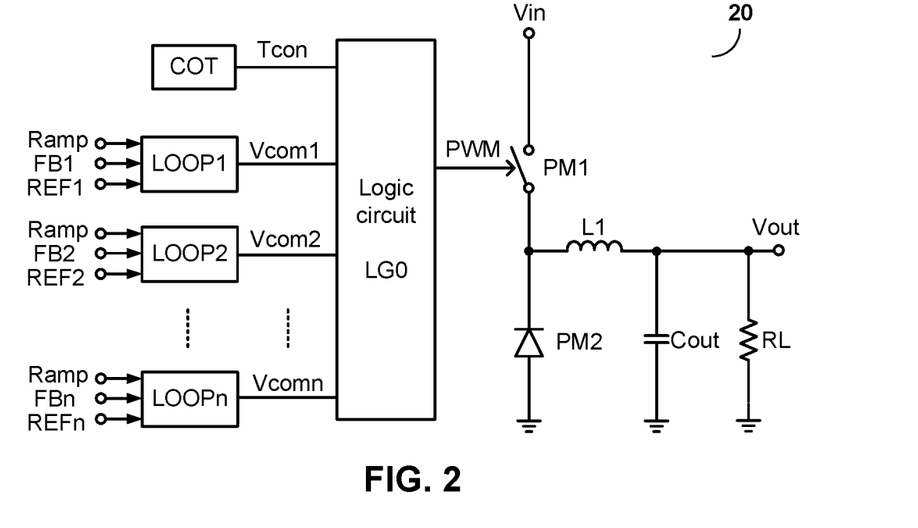
FIG. 2 schematically shows a charging circuit 20 in accordance with an embodiment of the present invention.

FIG. 2 schematically shows a charging circuit 20 in accordance with an embodiment of the present invention. As shown in FIG. 2, the charging circuit 20 comprises: a power switch PM1; a plurality of feedback control circuits LOOP1~LOOPn, wherein each feedback control circuit receives a corresponding reference signal REFi, a corresponding feedback signal FBi and a slope signal Ramp, and based on the corresponding reference signal REFi, the corresponding feedback signal FBi and the slope signal Ramp, each feedback control circuit generates a corresponding feedback control signal Vcomi, and wherein n is an integer larger than 1, and 1≤i≤n, a constant time signal generator COT configured to generate a constant time signal Tcon; and a logic circuit LG0 configured to receive a plurality of feedback control signals Vcom1~Vcomn and the constant time signal Tcon, and based on the plurality of feedback control signals Vcom1~Vcomn and the constant time signal Tcon, the logic circuit LG0 generates a switching signal PWM to control the operation of the power switch PM1.

Figure 3:
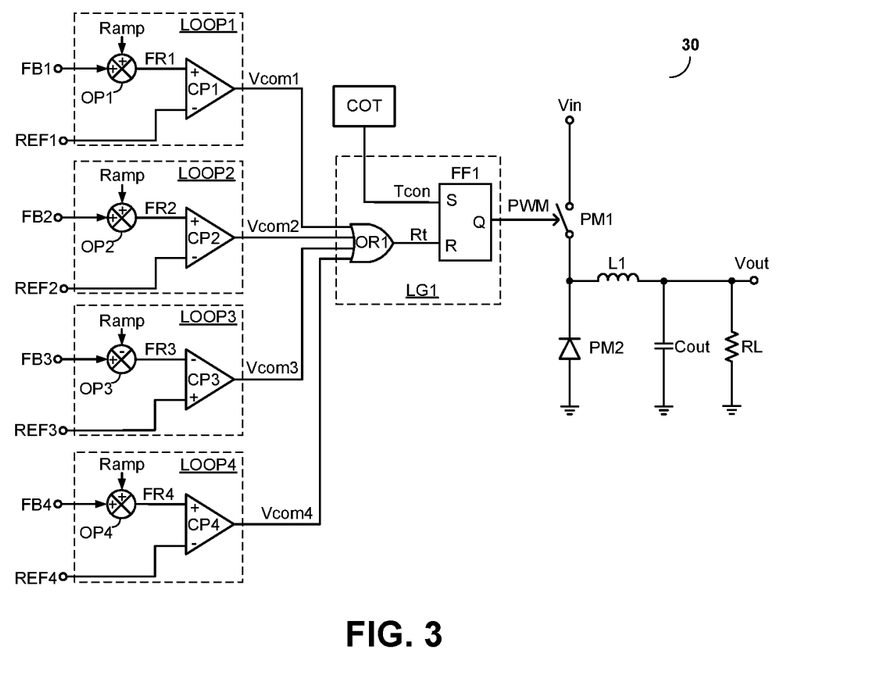
FIG. 3 schematically shows a charging circuit 30 in accordance with an embodiment of the present invention.

FIG. 3 schematically shows a charging circuit 30 in accordance with an embodiment of the present invention. As shown in FIG. 3, the charging circuit 30 comprises: a power switch (high-side power switch) PM1; feedback control circuits LOOP1~LOOP4 configured to respectively receive reference signals REF1~REF4, feedback signals FB1~FB4 and the slope signal Ramp, and wherein based on the corresponding reference signals REF1~REF4, the corresponding feedback signals FB1~FB4 and the slope signal Ramp, the feedback control circuits LOOP1~LOOP4 generate the corresponding feedback control signals Vcom1~Vcom4; a constant time signal generator COT configured to generate a constant time signal Tcon; and a logic circuit LG1 configured to receive the plurality of feedback control signals Vcom1~Vcom4 and the constant time signal Tcon, and to generate a switching signal PWM to control the operation of the power switch PM1.

As shown in FIG. 3, the charging circuit 30 adopts a BUCK converter as power convert circuit. Persons of ordinary skill in the art should know that power convert circuit with other topologies, e.g., BOOST converter, BUCK-BOOST converter, FLYBACK converter and so on, may be adopted by the charging circuit of the present invention. In one embodiment, the charging circuit 30 further comprises: a power switch PM2 (low-side power switch) coupled in series with the power switch PM1 between the input voltage Vin and a ground reference, wherein the power switches PM1 and PM2 are turned ON and OFF alternatively to control the power transferred to a load RL; an inductor L1 coupled between an output voltage Vout and the connection node of the power switches PM1 and PM2; and an output capacitor Cout coupled between the output voltage Vout and the ground reference.

In the example of FIG. 3, the power switch PM2 comprises a power diode. However, persons of ordinary skill in the art should know that the power switch PM2 may comprise any controllable switch, e.g., MOSFET, IGBT, etc.

In FIG. 3, the charging circuit 30 comprises four feedback control circuits for illustration. Persons of ordinary skill in the art should know that the charging circuits of the present invention may comprise any desired number of feedback control circuits.

In one embodiment, a first feedback control circuit LOOP1 is an output voltage feedback control circuit and comprises: a feedback arithmetic circuit OP1 having a first input terminal configured to receive a feedback signal FB1 representing the output voltage (battery voltage) Vout of the charging circuit 30, a second input terminal configured to receive a slope signal Ramp, and an output terminal configured to generate a feedback arithmetic signal FR1 based on the feedback signal FB1 and the slope signal Ramp; and a first comparator CP1 having a first input terminal (positive terminal) coupled to the feedback arithmetic circuit OP1 to receive the feedback arithmetic signal FR1, a second input terminal (negative terminal) configured to receive the corresponding reference signal REF1, and an output terminal configured to generate a first feedback control signal Vcom1 which is also referred as an output voltage control signal. In one embodiment, the feedback arithmetic signal FR1 is the sum of the feedback signal FB1 and the slope signal Ramp.

In one embodiment, a second feedback control circuit LOOP2 is an output current feedback control circuit and comprises: a feedback arithmetic circuit OP2 having a first input terminal configured to receive a feedback signal FB2 representing the output current (charging current) of the charging circuit 30, a second input terminal configured to receive the slope signal Ramp, and an output terminal configured to generate a feedback arithmetic signal FR2 based on the feedback signal FB2 and the slope signal Ramp; and a second comparator CP2 having a first input terminal (positive terminal) coupled to the feedback arithmetic circuit OP2 to receive the feedback arithmetic signal FR2, a second input terminal (negative terminal) configured to receive the corresponding reference signal REF2, and an output terminal configured to generate a second feedback control signal Vcom2 which is also referred as an output current control signal. In one embodiment, the feedback arithmetic signal FR2 is the sum of the feedback signal FB2 and the slope signal Ramp.

In one embodiment, a third feedback control circuit LOOP3 is an input voltage feedback control circuit and comprises: a feedback arithmetic circuit OP3 having a first input terminal configured to receive a feedback signal FB3 representing the input voltage (power supply voltage) Vin of the charging circuit 30, a second input terminal configured to receive the slope signal Ramp, and an output terminal configured to generate a feedback arithmetic signal FR3 based on the feedback signal FB3 and the slope signal Ramp; and a third comparator CP3 having a first input terminal (negative terminal) coupled to the feedback arithmetic circuit OP3 to receive the feedback arithmetic signal FR3, a second input terminal (positive terminal) configured to receive the corresponding reference signal REF3, and an output terminal configured to generate a third feedback control signal Vcom3 which is also referred as an input voltage control signal. In one embodiment, the feedback arithmetic signal FR3 is the subtraction result of the feedback signal FB3 and the slope signal Ramp.

In one embodiment, a fourth feedback control circuit LOOP4 is an input current feedback control circuit and comprises: a feedback arithmetic circuit OP4 having a first input terminal configured to receive a feedback signal FB4 representing the input current of the charging circuit 30, a second input terminal configured to receive the slope signal Ramp, and an output terminal configured to generate a feedback arithmetic signal FR4 based on the feedback signal FB4 and the slope signal Ramp; and a fourth comparator CP4 having a first input terminal (positive terminal) coupled to the feedback arithmetic circuit OP4 to receive the feedback arithmetic signal FR4, a second input terminal (negative terminal) configured to receive the corresponding reference signal REF4, and an output terminal configured to generate a fourth feedback control signal Vcom4 which is also referred as an input current control signal. In one embodiment, the feedback arithmetic signal FR4 is the sum of the feedback signal FB4 and the slope signal Ramp.

In one embodiment, the constant time signal generator COT comprises a constant OFF time circuit. During each switching cycle, the constant time signal Tcon has a pulse, which is used to trig the ON state of the power switch PM1 after a preset constant OFF time period. The constant OFF time circuit is well known to persons of ordinary skill in the art, and be not be discussed here for brevity.

In one embodiment, the logic circuit LG1 comprises: an OR gate OR1, having four input terminals configured to respectively receive the feedback control signals Vcom1~Vcom4, and an output terminal configured to generate a reset signal Rt based on the feedback control signals Vcom1~Vcom4; and a RS flip-flop FF1 having a set terminal "S" coupled to the constant time signal generator COT to receive the constant time signal Tcon, a reset terminal "R" coupled to the output terminal of the OR gate OR1 to receive the reset signal Rt, and an output terminal "Q" configured to provide the switching signal PWM based on the constant time signal Tcon and the reset signal Rt.

Figure 4:
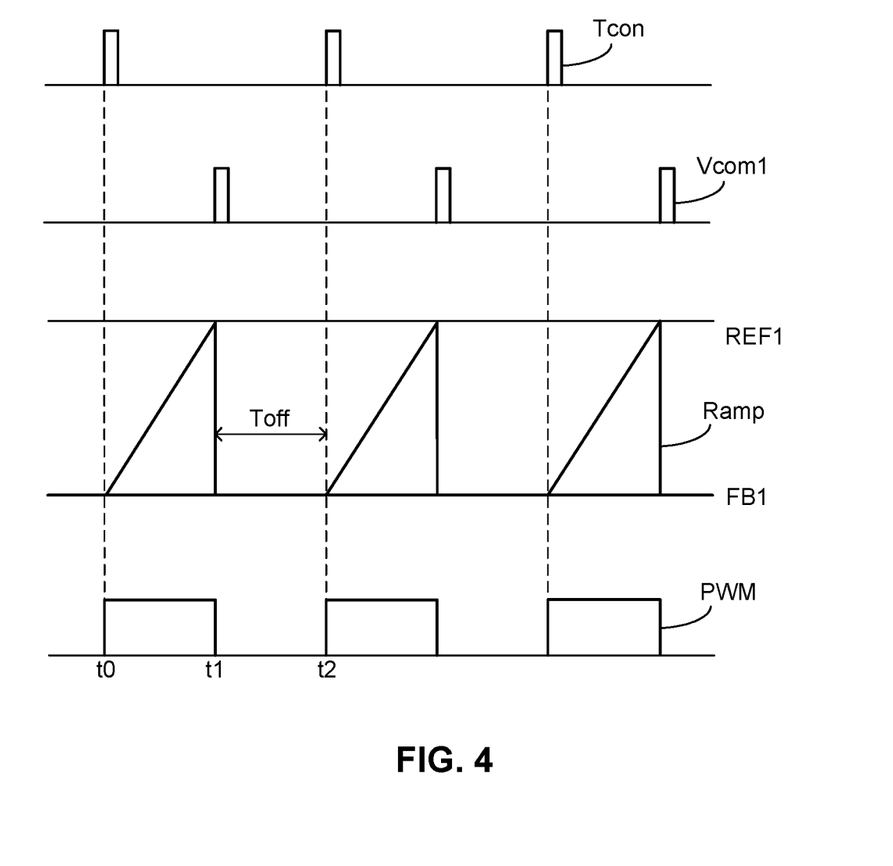
FIG. 4 shows the waveforms of the signals from the charging circuit 30 in FIG. 3.

FIG. 4 shows the waveforms of the signals from the charging circuit 30 in FIG. 3. The operation of the charging circuit 30 will be discussed with reference to FIGS. 3 and 4. In the example of FIG. 3, the energy transferred to the resistor RL (battery) is controlled by the ON and OFF of the power switches PM1 and PM2. The feedback control circuits are chosen automatically to control the operation of the power switches PM1 and PM2. Below the operation of the output voltage feedback control circuit is as an example of the operation of the feedback control circuits of the charging circuit 30. At time t0, the RS flip-flop FF1 is set by the constant time signal Ton. Accordingly, the power switch PM1 is turned on by the switching signal PWM. Meanwhile, the slope signal Ramp increases with a constant slope. At time t1, the sum of the feedback signal FB1 and the slope signal Ramp reaches the reference signal REF1, and the first comparator CP1 flips to generate the feedback control signal Vcom1 with high level voltage. Via the OR gate OR1, the feedback control signal Vcom1 then resets the RS flip-flop FF1. As a result, the switching signal PWM turns OFF the power switch PM1, and meanwhile the slope signal Ramp decreases. At time t2, i.e., after a preset constant time which is determined by the constant time signal Tcon, the RS flip-flop FF1 is set again, and the operation repeats.

The above discussion is about the operation of the output voltage feedback control circuit. In the charging circuit 30, the operations of the other feedback control circuits are similar with the operation of the output voltage feedback control circuit and will not be discussed here for brevity.

In the charging circuit 30, the feedback control signals provided by the other feedback control circuits are blocked when one of the feedback control circuit is working. As shown in FIG. 3, when the output voltage feedback control circuit is working, the charging circuit 30 charges the resistor RL (battery) with constant output voltage. During this time, the feedback signal FB2~FB4 are obviously small and the feedback control signals Vcom2~Vcom4 is with low level voltage and have no effect to the OR gate OR1.

As known from above discussion, the feedback control signals Vcom1~Vcom4 are all logic signals with high level voltage or low level voltage. Thus, the error switching among the feedback control circuits caused by similar value of the feedback control signals could be avoided. In the example of FIG. 3, once one of the comparators in any feedback control circuit flips, the corresponding feedback control circuit generates the feedback control signal to reset the RS flip-flop FF1. At the same time, the slope signal Ramp starts to decrease until the RS flip-flop FF1 is set. As a result, once one of the comparators in any feedback control circuit flips, other comparators in other feedback control circuits have no chance to flip. Thus, other feedback control circuits will not influence the logic circuit LG1 when one of the feedback control circuits dominates the feedback loop. In other words, the switching error between the feedback control circuits could be avoided.

In the example of FIG. 3, no oscillator with high frequency, error amplifier with high speed and high accuracy, or compensation circuit with complicated structure is needed in the charging circuit 30, so the charging circuit 30 has excellent portability.

In the example of FIG. 3, all the feedback control circuits adopt the same slope signal Ramp. Persons with ordinary skill in the art should know that slope signals having same phases but with different magnitudes may be used with the feedback control circuits. The slope signals having same phases but with different magnitudes may be obtained by an original slope signal multiplied with different coefficient.

Figure 5:
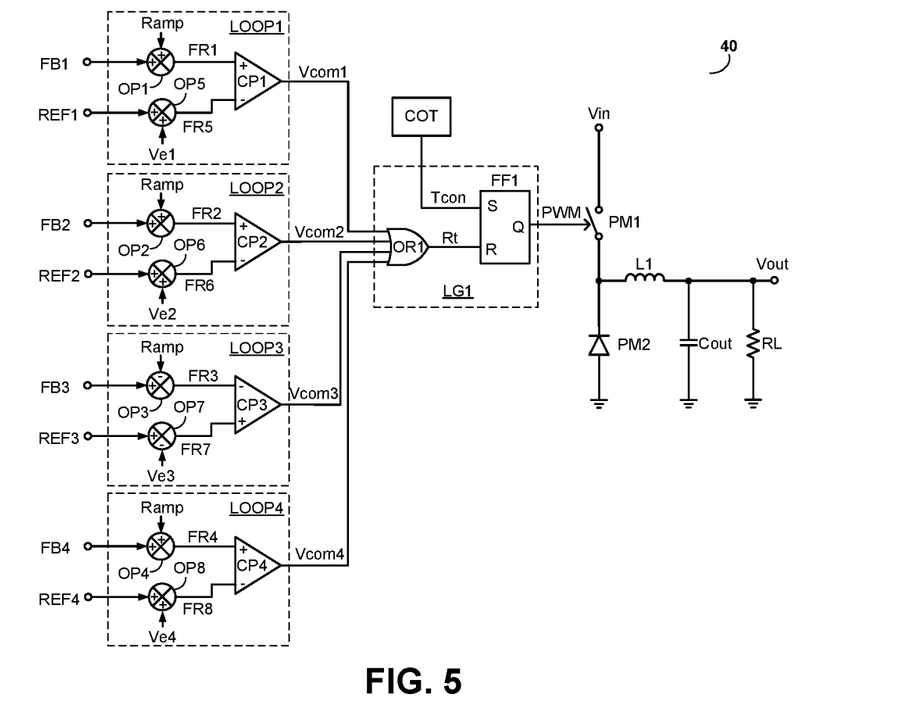
FIG. 5 schematically shows a charging circuit 40 in accordance with an embodiment of the present invention.
Figure 6:
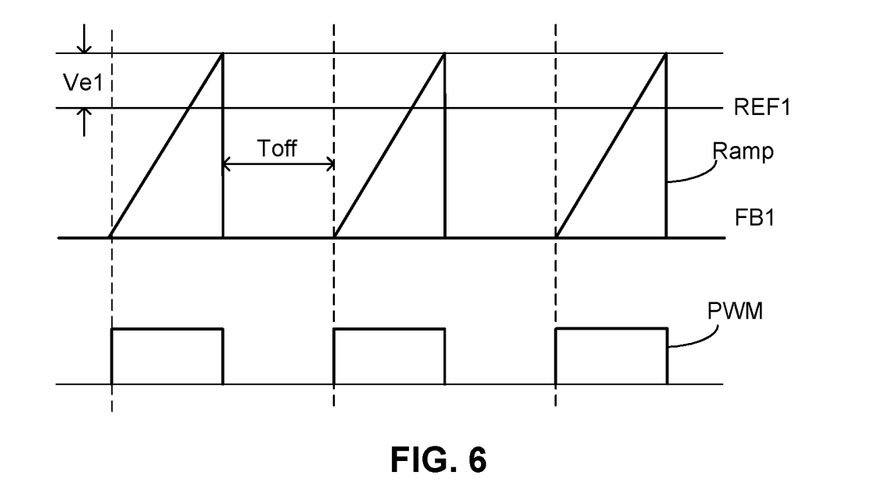
FIG. 6 shows waveforms of signals from the charging circuit 40 working under steady state.

FIG. 5 schematically shows a charging circuit 40 in accordance with an embodiment of the present invention. Compared with charging circuit 30 in FIG. 3, the reference signals REF1~REF4 of the charging circuit 40 are respectively corrected by error correcting signals Ve1~Ve4. FIG. 6 shows waveforms of signals from the charging circuit 40 working under steady state. As shown in FIG. 3, the reference signal REF1 is compared to the sum of the output voltage feedback signal FB1 and the slope signal Ramp. Thus, the output voltage feedback signal FB1 does not actually follow the reference signal REF1. To compensating this error, the charging circuit 40 adopts the error correcting signals Ve1~Ve4 to correct the reference signals REF1~REF4 via reference arithmetic circuits OP5~OP8 as shown in FIG. 6. The operation of the charging circuit 40 is similar with the operation of the charging circuit 30 and is not discussed here for brevity.

The error correcting signals Ve1~Ve4 may be obtained by calculating the errors between the corresponding feedback signals and the corresponding reference signals of the previous switching cycle. For example, an error amplifier may be adopted to indicate the error between the feedback signal and the reference signal. Persons of ordinary skill in the art should know that error amplifiers with low speed and low accuracy are good enough to generate the error correcting signals.

Figure 7:
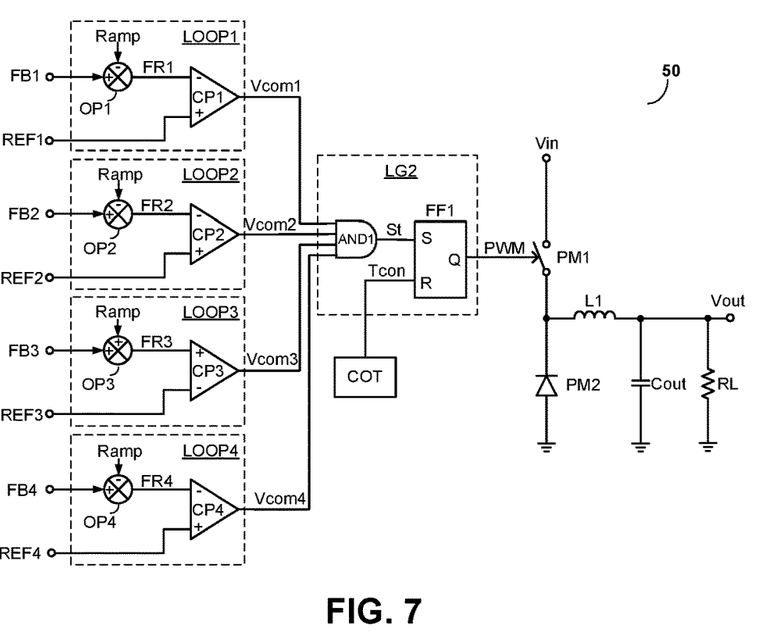
FIG. 7 schematically shows a charging circuit 50 in accordance with an embodiment of the present invention.

FIG. 7 schematically shows a charging circuit 50 in accordance with an embodiment of the present invention. The charging circuit 50 comprises: the power switch (high-side power switch) PM1; the feedback control circuits LOOP1~LOOP4 configured to respectively receive the reference signals REF1~REF4, the feedback signals FB1~FB4 and the slope signal Ramp, and wherein based on the corresponding reference signals REF1~REF4, the corresponding feedback signals FB1~FB4 and the slope signal Ramp, the feedback control circuits LOOP1~LOOP4 generate the corresponding feedback control signals Vcom1~Vcom4; the constant time signal generator COT configured to generate the constant time signal Tcon; and a logic circuit LG2 configured to receive the feedback control signals Vcom1~Vcom4 and the constant time signal Tcon, and to generate the switching signal PWM to control the operation of the power switch PM1 based on the feedback control signals Vcom1~Vcom4 and the constant time signal Tcon.

In one embodiment, the first feedback control circuit LOOP1 is the output voltage feedback control circuit and comprises: the feedback arithmetic circuit OP1 having a first input terminal configured to receive the feedback signal FB1 representing the output voltage (battery voltage) Vout of the charging circuit 50, a second input terminal configured to receive the slope signal Ramp, and an output terminal configured to generate the feedback arithmetic signal FR1 based on the feedback signal FB1 and the slope signal Ramp; and the first comparator CP1 having a first input terminal (negative terminal) coupled to the feedback arithmetic circuit OP1 to receive the feedback arithmetic signal FR1, a second input terminal (positive terminal) configured to receive the corresponding reference signal REF1, and an output terminal configured to generate the first feedback control signal Vcom1, which is also referred as the output voltage control signal. In one embodiment, the feedback arithmetic signal FR1 is the subtraction result of the feedback signal FB1 and the slope signal Ramp.

In one embodiment, the second feedback control circuit LOOP2 is the output current feedback control circuit and comprises: the feedback arithmetic circuit OP2 having a first input terminal configured to receive the feedback signal FB2 representing the output current (charging current) of the charging circuit 50, a second input terminal configured to receive the slope signal Ramp, and an output terminal configured to generate the feedback arithmetic signal FR2 based on the feedback signal FB2 and the slope signal Ramp; and the second comparator CP2 having a first input terminal (negative terminal) coupled to the feedback arithmetic circuit OP2 to receive the feedback arithmetic signal FR2, a second input terminal (positive terminal) configured to receive the corresponding reference signal REF2, and an output terminal configured to generate the second feedback control signal Vcom2 which is also referred as the output current control signal. In one embodiment, the feedback arithmetic signal FR2 is the subtraction result of the feedback signal FB2 and the slope signal Ramp.

In one embodiment, the third feedback control circuit LOOP3 is the input voltage feedback control circuit and comprises: the feedback arithmetic circuit OP3 having a first input terminal configured to receive the feedback signal FB3 representing the input voltage (power supply voltage) Vin of the charging circuit 50, a second input terminal configured to receive the slope signal Ramp, and an output terminal configured to generate the feedback arithmetic signal FR3 based on the feedback signal FB3 and the slope signal Ramp; and the third comparator CP3 having a first input terminal (positive terminal) coupled to the feedback arithmetic circuit OP3 to receive the feedback arithmetic signal FR3, a second input terminal (negative terminal) configured to receive the corresponding reference signal REF3, and an output terminal configured to generate the third feedback control signal Vcom3 which is also referred as the input voltage control signal. In one embodiment, the feedback arithmetic signal FR3 is the sum of the feedback signal FB3 and the slope signal Ramp.

In one embodiment, the fourth feedback control circuit LOOP4 is the input current feedback control circuit and comprises: the feedback arithmetic circuit OP4 having a first input terminal configured to receive the feedback signal FB4 representing the input current of the charging circuit 50, a second input terminal configured to receive the slope signal Ramp, and an output terminal configured to generate the feedback arithmetic signal FR4 based on the feedback signal FB4 and the slope signal Ramp; and the fourth comparator CP4 having a first input terminal (negative terminal) coupled to the feedback arithmetic circuit OP4 to receive the feedback arithmetic signal FR4, a second input terminal (positive terminal) configured to receive the corresponding reference signal REF4, and an output terminal configured to generate the fourth feedback control signal Vcom4 which is also referred as the input current control signal. In one embodiment, the feedback arithmetic signal FR4 is the subtraction result of the feedback signal FB4 and the slope signal Ramp.

In one embodiment, the constant time signal generator COT comprises a constant ON time circuit. During each switching cycle, the constant time signal Tcon has a pulse, which is used to trig the OFF state of the power switch PM1 after a preset constant ON time period. The constant ON time circuit is well known to persons of ordinary skill in the art, and will not be discussed here for brevity.

In one embodiment, the logic circuit LG2 comprises: an AND gate AND1 having four input terminals configured to respectively receive the feedback control signals Vcom1~Vcom4, and an output terminal configured to generate a set signal St based on the feedback control signals Vcom1~Vcom4; and the RS flip-flop FF1 having a set terminal "S" coupled to the output terminal of the AND gate AND1 to receive the set signal St, a reset terminal "R" coupled to the constant time signal generator COT to receive the constant time signal Tcon, and an output terminal "Q" configured to provide the switching signal PWM based on the constant time signal Tcon and the set signal St.

Figure 8:
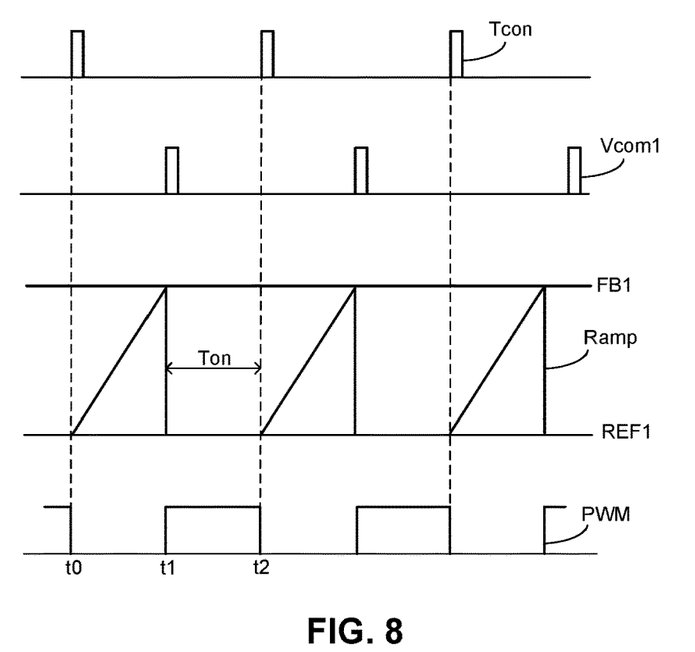
FIG. 8 shows the waveforms of the signals from the charging circuit 50 in FIG. 7.

FIG. 8 shows the waveforms of the signals from the charging circuit 50 in FIG. 7. The operation of the charging circuit 50 is discussed with reference to FIGS. 7 and 8. Below the operation of the output voltage feedback control circuit is explained as an example of the operation of the feedback control circuits of the charging circuit 50. At time t0, the constant time signal Ton resets the RS flip-flop FF1 to generate the switching signal PWM to turn OFF the power switch PM1. Meanwhile, the slope signal Ramp increases with a constant slope. At time t1, the subtraction result of the feedback signal FB1 and the slope signal Ramp reaches the reference signal REF1, and the first comparator CP1 flips to generate the feedback control signal Vcom1 with low level voltage. Via the AND gate AND1, the feedback control signal Vcom1 then sets the RS flip-flop FF1 as the set signal St. As a result, the switching signal PWM turns ON the power switch PM1, and meanwhile the slope signal Ramp decreases. At time t2, i.e., after a preset constant time which is determined by the constant time signal Tcon, the RS flip-flop FF1 is reset again, and the operation repeats.

The above discussion is about the operation of the output voltage feedback control circuit. In the charging circuit 50, the operations of the other feedback control circuits are similar with the operation of the output voltage feedback control circuit and will not be discussed here for brevity.

In the charging circuit 50, the feedback control signals provided by the other feedback control circuits are blocked when one of the feedback control circuit is working. As shown in FIG. 7, when the output voltage feedback control circuit is working, the charging circuit 50 charges the resistor RL (battery) with constant output voltage. During this time, the feedback signal FB2~FB4 are obviously small and the feedback control signals Vcom2~Vcom4 are all with high level voltage and have no effect to the AND gate AND1.

Figure 9:
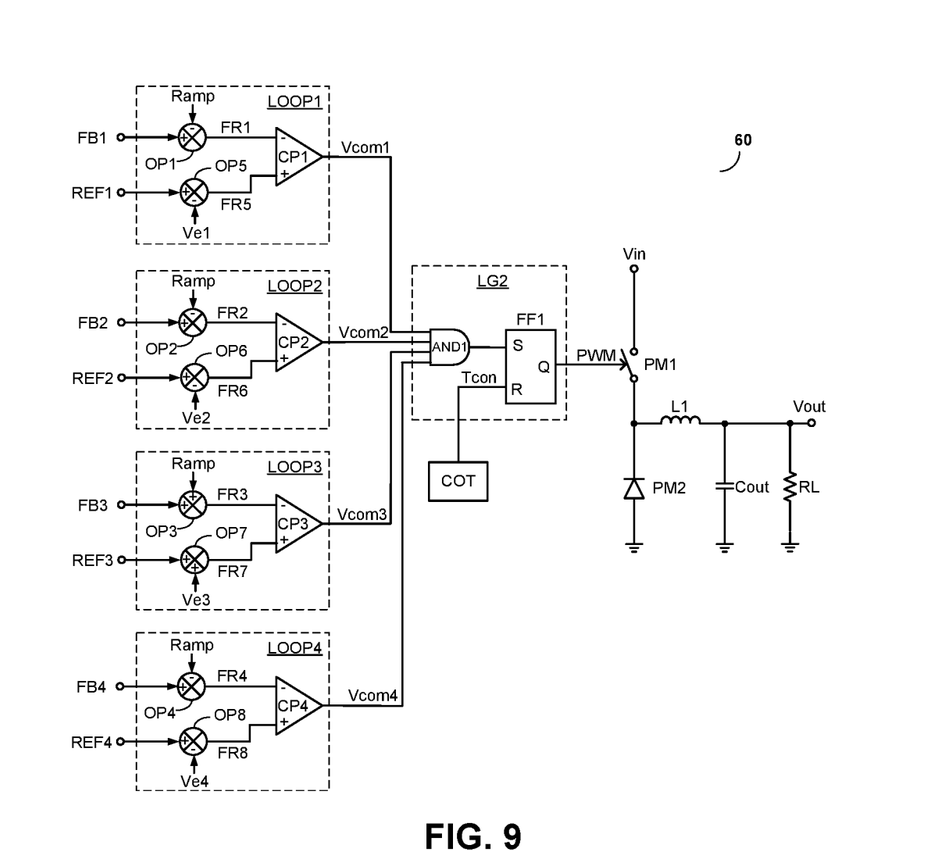
FIG. 9 schematically shows a charging circuit 60 in accordance with an embodiment of the present invention.
Figure 10:
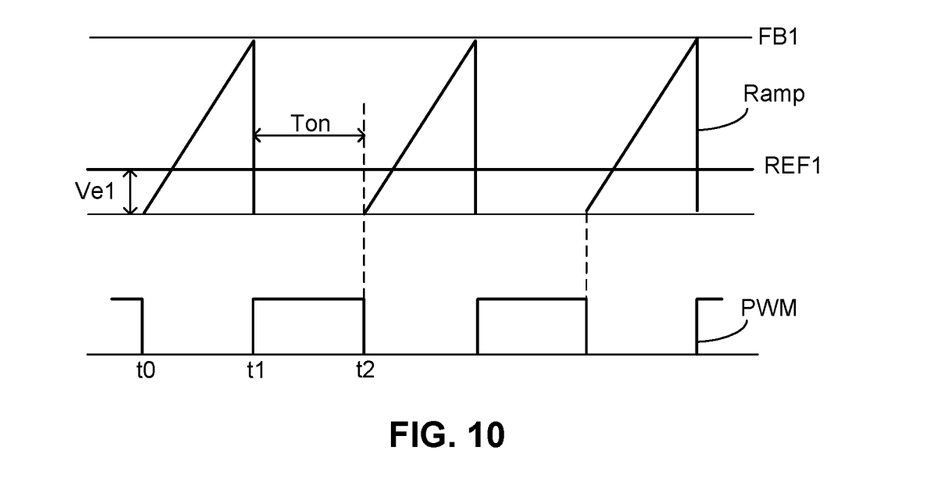
FIG. 10 shows waveforms of signals from the charging circuit 60 working under steady state.

FIG. 9 schematically shows a charging circuit 60 in accordance with an embodiment of the present invention. Compared with charging circuit 50 in FIG. 7, the reference signals REF1~REF4 of the charging circuit 60 are respectively corrected by error correcting signals Ve1~Ve4. FIG. 10 shows waveforms of signals from the charging circuit 60 working under steady state. As shown in FIG. 7, the reference signal REF1 is compared to the subtraction result of the output voltage feedback signal FB1 and the slope signal Ramp. Thus, the output voltage feedback signal FB1 does not actually follow the reference signal REF1. To compensating the said error, the charging circuit 60 adopts the error correcting signals Ve1~Ve4 to correct the reference signals REF1~REF4 via reference arithmetic circuits OP5~OP8 as shown in FIG. 10. The operation of the charging circuit 60 is similar with the operation of the charging circuit 50 and will not be discussed here for brevity.

The error correcting signals Ve1~Ve4 may be obtained by calculating the errors between the corresponding feedback signals and the corresponding reference signals of the previous switching cycle. For example, an error amplifier may be adopted to indicate the error between the feedback signal and the reference signal. Persons of ordinary skill in the art should know that error amplifiers with low speed and low accuracy are good enough to generate the error correcting signals.

The charging circuits 30~60 schematically show the control circuits for output voltage, output current, input voltage and input current of the system. Persons of ordinary skill in the art should know that any feedback variable may be added to the control circuits of the charging circuit as needed.

Figure 11:
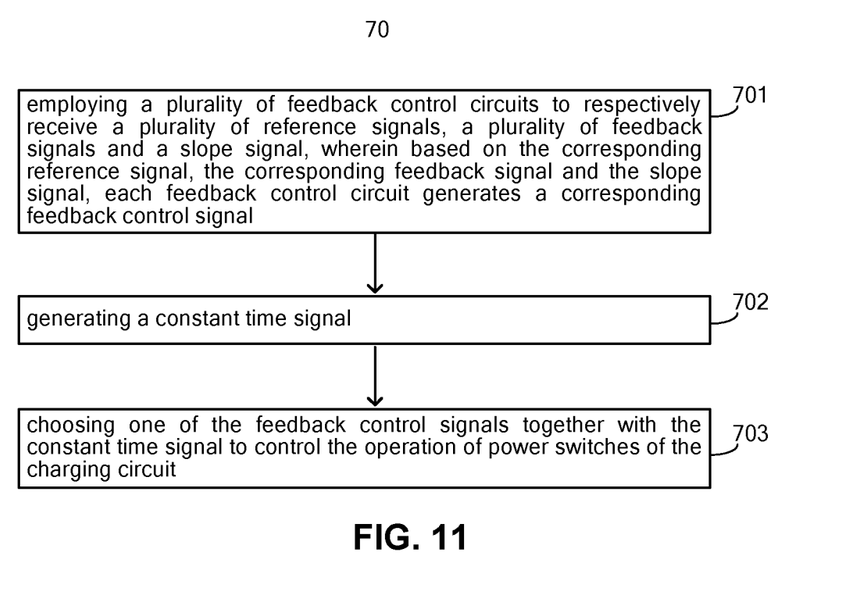
FIG. 11 shows a method 70 for controlling a charging circuit in accordance with an embodiment of the present invention.

FIG. 11 shows a method 70 for controlling a charging circuit in accordance with an embodiment of the present invention. The method 70 may be used with the charging circuits mentioned hereinbefore. As shown in FIG. 11, the method 70 comprises: step 701, employing a plurality of feedback control circuits to respectively receive a plurality of reference signals, a plurality of feedback signals and a slope signal, wherein based on the corresponding reference signal, the corresponding feedback signal and the slope signal, each feedback control circuit generates a corresponding feedback control signal; step 702, generating a constant time signal; and step 703, choosing one of the feedback control signals together with the constant time signal to control the operation of power switches of the charging circuit.

In one embodiment, the step 701 comprises: performing arithmetic operation on the corresponding feedback signal and the slope signal to get a corresponding feedback arithmetic signal; and comparing the feedback arithmetic signal to the corresponding reference signal to generate the corresponding feedback control signal.

In one embodiment, the arithmetic operation comprises addition or subtraction.

In one embodiment, the constant time signal comprises a constant ON time signal.

In one embodiment, the constant time signal comprises a constant OFF time signal.

In one embodiment, the reference signal is corrected before comparison to the feedback arithmetic signal, wherein the correction operation comprises adding an error correcting signal to the corresponding reference signal or subtracting an error correcting signal from the corresponding reference signal.

The present invention provides charging circuits with simple structure. The charging circuit comprises a plurality of control circuits which could automatically switch to each other without error. In the present charging circuits, the compensation circuits, and the error amplifiers with high accuracy and high speed could be saved. Thus the charging circuit has excellent portability.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A charging circuit, comprising:
a power switch;
a plurality of feedback control circuits, wherein each feedback control circuit receives a corresponding reference signal, a corresponding feedback signal, a corresponding error correcting signal and a slope signal, and based on the corresponding error correcting signal, the corresponding reference signal, the corresponding feedback signal and the slope signal, each of the feedback control circuits generates a corresponding feedback control signal;
a constant time signal generator configured to generate a constant time signal; and
a logic circuit configured to receive the plurality of feedback control signals and the constant time signal, and based on the plurality of feedback control signals and the constant time signal, the logic circuit generates a switching signal to control the operation of the power switch.

2. The charging circuit of claim 1, wherein each feedback control circuit comprises:
a feedback arithmetic circuit having a first input terminal configured to receive the corresponding feedback signal, a second input terminal configured to receive the slope signal, and an output terminal configured to generate a feedback arithmetic signal based on the corresponding feedback signal and the slope signal; and
a comparator having a first input terminal coupled to the feedback arithmetic circuit to receive the feedback arithmetic signal, a second input terminal configured to receive the corresponding reference signal, and an output terminal configured to generate the feedback control signal based on the feedback arithmetic signal and the corresponding reference signal.

3. The charging circuit of claim 2, wherein the logic circuit comprises:
an OR gate, having a plurality of input terminals configured to respectively receive the feedback control signals, and an output terminal configured to generate a reset signal based on the feedback control signals; and
a RS flip-flop having a set terminal coupled to the constant time signal generator to receive the constant time signal, a reset terminal coupled to the output terminal of the OR gate to receive the reset signal, and an output terminal configured to provide the switching signal based on the constant time signal and the reset signal.

4. The charging circuit of claim 2, wherein the logic circuit comprises:
an AND gate, having a plurality of input terminals configured to respectively receive the feedback control signals, and an output terminal configured to generate a set signal based on the feedback control signals; and
a RS flip-flop having a set terminal coupled to the output terminal of the AND gate to receive the set signal, a reset terminal coupled to the constant time signal generator to receive the constant time signal, and an output terminal configured to provide the switching signal based on the constant time signal and the set signal.

5. The charging circuit of claim 1, wherein each feedback control circuit comprises:
a feedback arithmetic circuit having a first input terminal configured to receive the corresponding feedback signal, a second input terminal configured to receive the slope signal, and an output terminal configured to generate a feedback arithmetic signal based on the feedback signal and the slope signal;
a reference arithmetic circuit having a first input terminal configured to receive the corresponding reference signal, a second input terminal configured to receive the corresponding error correcting signal, and an output terminal configured to generate a reference arithmetic signal based on the corresponding reference signal and the corresponding error correcting signal; and
a comparator having a first input terminal coupled to the corresponding feedback arithmetic circuit to receive the corresponding feedback arithmetic signal, a second input terminal coupled to the corresponding reference arithmetic circuit to receive the corresponding reference arithmetic signal, and an output terminal configured to generate the corresponding feedback control signal based on the feedback arithmetic signal and the reference arithmetic signal.

6. The charging circuit of claim 5, wherein the logic circuit comprises:
an OR gate, having a plurality of input terminals configured to respectively receive the feedback control signals, and an output terminal configured to generate a reset signal based on the feedback control signals; and
a RS flip-flop having a set terminal coupled to the constant time signal generator to receive the constant time signal, a reset terminal coupled to the output terminal of the OR gate to receive the reset signal, and an output terminal configured to provide the switching signal based on the constant time signal and the reset signal.

7. The charging circuit of claim 5, wherein the logic circuit comprises:
an AND gate, having a plurality of input terminals configured to respectively receive the feedback control signals, and an output terminal configured to generate a set signal based on the feedback control signals; and
a RS flip-flop having a set terminal coupled to the output terminal of the AND gate to receive the set signal, a reset terminal coupled to the constant time signal generator to receive the constant time signal, and an output terminal configured to provide the switching signal based on the constant time signal and the set signal.

8. A charging circuit with a power switch, comprising:
an output voltage feedback control circuit comprising a first comparator having a first input terminal configured to receive an output voltage feedback signal and a slope signal, a second input terminal configured to receive a corresponding reference signal, and an output terminal configured to generate an output voltage control signal based on the reference signal, the output voltage feedback signal and the slope signal, wherein the output voltage feedback signal and the slope signal are performed a sum operation before sending to the first input terminal of the first comparator;
an output current feedback control circuit comprising a second comparator having a first input terminal configured to receive an output current feedback signal and the slope signal, a second input terminal configured to receive a corresponding reference signal, and an output terminal configured to generate an output current control signal based on the reference signal, the output current feedback signal and the slope signal, wherein the output current feedback signal and the slope signal are performed the sum operation before sending to the first input terminal of the second comparator;

an input voltage feedback control circuit comprising a third comparator having a first input terminal configured to receive of an input voltage feedback signal and the slope signal, a second input terminal configured to receive a corresponding reference signal, and an output terminal configured to generate an input voltage control signal based on the reference signal, the input voltage feedback signal and the slope signal, wherein the input voltage feedback signal and the slope signal are performed a subtraction operation before sending to the first input terminal of the third comparator;

an input current feedback control circuit comprising a fourth comparator having a first input terminal configured to receive an input current feedback signal and the slope signal, a second input terminal configured to receive a corresponding reference signal, and an output terminal configured to generate an input current control signal based on the reference signal, the input current feedback signal and the slope signal, wherein the input current feedback signal and the slope signal are performed the sum operation before sending to the first input terminal of the forth comparator;

a constant time signal generator configured to generate a constant time signal; and a logic circuit configured to receive the output voltage control signal, the output current control signal, the input voltage control signal, the input current control signal and the constant time signal, wherein the logic circuit generate a switching signal to control the operation of the power switch based on the output voltage control signal, the output current control signal, the input voltage control signal, the input current control signal and the constant time signal.

9. The charging circuit of claim 8, wherein the logic circuit comprises:

an OR gate, having fourth input terminals configured to respectively receive the output voltage control signal, the output current control signal, the input voltage control signal and the input current control signal, and an output terminal configured to generate a reset signal based on the output voltage control signal, the output current control signal, the input voltage control signal and the input current control signal; and a RS flip-flop having a set terminal coupled to the constant time signal generator to receive the constant time signal, a reset terminal coupled to the output terminal of the OR gate to receive the reset signal, and an output terminal configured to provide the switching signal based on the constant time signal and the reset signal; wherein the constant time signal has pulse after a constant time from when the power switch is turned OFF, and wherein the pulse is configured to turn ON the power switch.

10. The charging circuit of claim 8, wherein the output voltage feedback signal and the slope signal are performed a subtraction operation before sending to the first input terminal of the first comparator;

the output current feedback signal and the slope signal are performed the subtraction operation before sending to the first input terminal of the second comparator;

the input voltage feedback signal and the slope signal are performed a sum operation before sending to the first input terminal of the third comparator; and the input current feedback signal and the slope signal are performed the subtraction operation before sending to the first input terminal of the forth comparator.

11. The charging circuit of claim 10, wherein the logic circuit comprises:

an AND gate, having fourth input terminals configured to respectively receive the output voltage control signal, the output current control signal, the input voltage control signal and the input current control signal, and an output terminal configured to generate a set signal based on the output voltage control signal, the output current control signal, the input voltage control signal and the input current control signal; and a RS flip-flop having a set terminal coupled to the output terminal of the AND gate to receive the set signal, a reset terminal coupled to the constant time signal generator to receive the constant time signal, and an output terminal configured to provide the switching signal based on the constant time signal and the set signal; wherein the constant time signal has a pulse after a constant time from when the power switch is turned ON, and wherein the pulse is configured to turn OFF the power switch.

12. A method of controlling a charging circuit having a power switch, comprising:

employing a plurality of feedback control circuits to respectively receive a plurality of reference signals, a plurality of feedback signals and a slope signal, wherein based on the corresponding reference signal, the corresponding feedback signal and the slope signal, each feedback control circuit generates a corresponding feedback control signal;

generating a constant time signal; and choosing only one of the feedback control signals together with the constant time signal to control the operation of power switches of the charging circuit;

wherein the reference signal is corrected before comparison to the feedback arithmetic signal, and wherein the correction operation comprises adding an error correcting signal to the corresponding reference signal or subtracting an error correcting signal from the corresponding reference signal.

13. The method of claim 12, wherein based on the corresponding reference signal, the corresponding feedback signal and the slope signal, each feedback control circuit generates a corresponding feedback control signal comprising:

performing arithmetic operation to the corresponding feedback signal and the slope signal to get a corresponding feedback arithmetic signal; and comparing the feedback arithmetic signal to the corresponding reference signal to generate the corresponding feedback control signal.

14. The method of claim 12, wherein the constant time signal comprises a constant ON time signal.

15. The method of claim 12, wherein the constant time signal comprises a constant OFF time signal.

16. The method of claim 13, wherein the arithmetic operation comprises a sum operation or a subtraction operation.

* * * * *